United States Patent
Zhao et al.

(10) Patent No.: US 9,490,901 B2
(45) Date of Patent: Nov. 8, 2016

(54) BIAS MONITORING METHOD AND APPARATUS AND TRANSMITTER

(71) Applicant: FUJITSU LIMITED, Kawasaki-shi, Kanagawa (JP)

(72) Inventors: Ying Zhao, Beijing (CN); Liang Dou, Beijing (CN); Zhenning Tao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/691,928

(22) Filed: Apr. 21, 2015

(65) Prior Publication Data
US 2015/0318921 A1 Nov. 5, 2015

(30) Foreign Application Priority Data

Apr. 30, 2014 (CN) .......................... 2014 1 0181450

(51) Int. Cl.
| | |
|---|---|
| *H04B 10/00* | (2013.01) |
| *H04B 10/50* | (2013.01) |
| *H04B 10/079* | (2013.01) |
| *H04B 10/516* | (2013.01) |
| *H04B 10/2575* | (2013.01) |
| *H04J 14/00* | (2006.01) |

(52) U.S. Cl.
CPC .... *H04B 10/50595* (2013.01); *H04B 10/0795* (2013.01); *H04B 10/2575* (2013.01); *H04B 10/50575* (2013.01); *H04B 10/516* (2013.01)

(58) Field of Classification Search
CPC .................. H04B 10/5057; H04B 10/50575
USPC ................................................. 398/195, 198
See application file for complete search history.

(56) References Cited

U.S. PATENT DOCUMENTS

| | | | | |
|---|---|---|---|---|
| 2010/0247113 A1* | 9/2010 | Kaneda | .................. | H04B 10/60 398/208 |
| 2013/0202315 A1* | 8/2013 | Akiyama | ............... | H04B 10/50 398/182 |
| 2014/0010533 A1 | 1/2014 | Yan et al. | | |

FOREIGN PATENT DOCUMENTS

CN        103532633        1/2014

OTHER PUBLICATIONS

Wang, Li, et al.; "A Versatile Bias Control Technique for Any-Point Locking in Lithium Niobate Mach-Zehnder Modulators", Journal of Lightwave Technology, vol. 28, No. 11, Jun. 1, 2010, pp. 1703-1706.

(Continued)

*Primary Examiner* — Daniel Dobson
(74) *Attorney, Agent, or Firm* — Staas & Halsey LLP

(57) ABSTRACT

A bias monitoring method and apparatus and a transmitter, the bias monitoring apparatus being used for monitoring deviation of a direct current bias point of an optoelectronic modulator and including: a first signal processing unit configured to perform first signal processing on an electric driving signal inputted into the optoelectronic modulator, so as to output a reference signal; a second signal processing unit configured to perform second signal processing on an electric output signal obtained based on an optical signal outputted by the optoelectronic modulator, so as to output a monitoring signal; and a monitoring signal calculating unit configured to calculate correlation between the reference signal and the monitoring signal, and output a calculation result of the correlation as a bias monitoring signal. The sensitivity of the bias monitoring apparatus may be improved, and complexity of hardware may be lowered.

9 Claims, 13 Drawing Sheets

(56) References Cited

OTHER PUBLICATIONS

Dou, Liang, et al.; "Electronic Pre-Distortion Operating at 1 Sample/symbol with Accurate Bias Control for CD Compensation", OSA/OFC/NFOEC 2010; 2 pages.

Cho, Pak S, et al..; "Closed-Loop Bias Control of Optical Quadrature Modulator" IEEE Photonics Technology Letters vol. 18, No. 21, Nov. 1, 2006, pp. 2209-2211.

* cited by examiner

BIAS MONITORING METHOD AND APPARATUS AND TRANSMITTER

CROSS REFERENCE TO RELATED APPLICATIONS

This application claims the benefit of Chinese Application No. 201410181450.5, filed Apr. 30, 2014, the disclosure of which is incorporated herein by reference.

BACKGROUND

1. Field

The present disclosure relates to the field of optical communication technologies, and in particular to a bias monitoring method and apparatus and a transmitter.

2. Description of the Related Art

In an optical transmitter, an optoelectronic modulator is used to modulate an inputted electric driving signal into an optical carrier and output an optical signal, with its operational principle being similar to that of a multiplier. In operation, the optoelectronic modulator needs to be applied direct current bias, so that it operates at a suitable direct current bias point. Therefore, a modulation feature of the optoelectronic modulator is related to a direct current bias point where it is located, and for a typical coherent optical communication system, an ideal direct current bias point of the optoelectronic modulator is at its half-wave transfer point.

In a long-haul optical communication system, a signal damage brought by deviation of a bias point of an optoelectronic modulator in a transmitter cannot be compensated for at a receiver side by a digital signal processor (DSP), thereby resulting in degradation of transmission performance. If the dynamic deviation of the bias point of the optoelectronic modulator is not tracked and corrected, said signal damage will become inherent damage to the system, and further affect the transmission quality along with the time.

In prior art, an LiNbO3 modulator for realizing high-speed optoelectronic transform usually needs to be introduced an automatic bias control (ABC) module at a receiver to dynamically track deviation of a bias point, so as to realize stable operation of the transmitter at relatively long time.

For typical application of an optoelectronic modulator in a communication system, that is, a direct current bias point is located at a half-wave transform point Vπ of the modulator, automatic bias control schemes discussed in Document 1 and Document 2 often use a manner of introducing scrambling frequencies on a basis of direct current bias, and use a method for sounding direct current optical power, a scrambling frequency linear term or a mixing term at an output end of a modulator to perform feedback closed-loop control on the direct current bias point.

In order to enhance sensitivity of a sounding signal to deviation of a bias point, Document 3 proposes an optical domain intra-variance sounding scheme based on a 3×3 coupler, in which sensitivity of a sounding signal is improved by using a self-coherent method.

Document 1: Pak S. Cho, et al., Photon. Technol. Lett. 18 (21), 2006;

Document 2: Li L., et al., J. Lightwave Technol. 28(11), 2010; and

Document 3: Liang D., Proc. OFC'20, OThT4, 2010.

It should be noted that the above description of the background is merely provided for clear and complete explanation of the present disclosure and for easy understanding by those skilled in the art. And it should not be understood that the above technical solution is known to those skilled in the art as it is described in the background of the present disclosure.

SUMMARY

In the bias monitoring methods based on scrambling frequencies disclosed in Document 1 and Document 2, direction intensity sounding is used, which results in that a sounding signal is less sensitive to deviation of a bias point, it is not applicable to application scenarios having a higher requirement of stability on a bias point. And introduction and sounding of a scrambling frequency increase hardware overhead of a transmitter to a certain extent, and is disadvantageous to cost control. And in the bias monitoring method based on optical domain self coherence disclosed in Document 3, as a 3×3 coupler is introduced and requires the self-coherent system to ensure bias, the needed hardware overhead is still excessively high, and is not applicable to realization of products.

Embodiments of the present disclosure provide a bias monitoring apparatus based on electric signal correlation, which uses a feature that correlation between an electric driving signal and an output signal of an optoelectronic modulator is sensitive to a direct current bias point, to detect deviation of a direct current bias point of an optoelectronic modulator, and is capable of improving sensitivity of the bias monitoring apparatus and lowering hardware complexity.

According to a first aspect of the embodiments of the present disclosure, there is provided a bias monitoring apparatus, used for monitoring deviation of a direct current bias point of an optoelectronic modulator, the bias monitoring apparatus including:

a first signal processing unit, configured to perform first signal processing on an electric driving signal inputted into the optoelectronic modulator, so as to output a reference signal;

a second signal processing unit, configured to perform second signal processing on an electric output signal obtained based on an optical signal outputted by the optoelectronic modulator, so as to output a monitoring signal; and a monitoring signal calculating unit, configured to calculate correlation between the reference signal and the monitoring signal, and output a calculation result of the correlation as a bias monitoring signal.

According to a second aspect of the embodiments of the present disclosure, there is provided an optical transmitter, including an optoelectronic modulator, a bias control device and the bias monitoring apparatus as described in the first aspect; wherein the bias control device regulates a bias point of the optoelectronic modulator according to a bias monitoring signal.

According to a third aspect of the embodiments of the present disclosure, there is provided a bias monitoring method, used for monitoring deviation of a direct current bias point of an optoelectronic modulator, the bias monitoring method comprising:

performing first signal processing on an electric driving signal inputted into the optoelectronic modulator, so as to output a reference signal;

performing second signal processing on an electric output signal obtained based on an optical signal outputted by the optoelectronic modulator, so as to output a monitoring signal; and calculating correlation between the reference signal and the monitoring signal, and outputting a calculation result of the correlation as a bias monitoring signal.

An advantage of the embodiments of the present disclosure exists in that signal processing is performed on the electric driving signal of the optoelectronic modulator to obtain the reference signal, signal processing is performed on the electric output signal obtained based on the optical signal outputted by the optoelectronic modulator to obtain the monitoring signal, and correlation between the reference signal and the monitoring signal is calculated, thereby improving sensitivity of the bias monitoring apparatus and lowering hardware complexity.

With reference to the following description and drawings, the particular embodiments of the present disclosure are disclosed in detail, and the principle of the present disclosure and the manners of use are indicated. It should be understood that the scope of the embodiments of the present disclosure is not limited thereto. The embodiments of the present disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the preferred embodiments of the present disclosure, and are used for setting forth the principles of the present disclosure together with the description. It is obvious that the accompanying drawings in the following description are some embodiments of the present disclosure only, and a person of ordinary skill in the art may obtain other drawings according to these accompanying drawings without making an inventive effort. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

Embodiment 1

Figure 1:
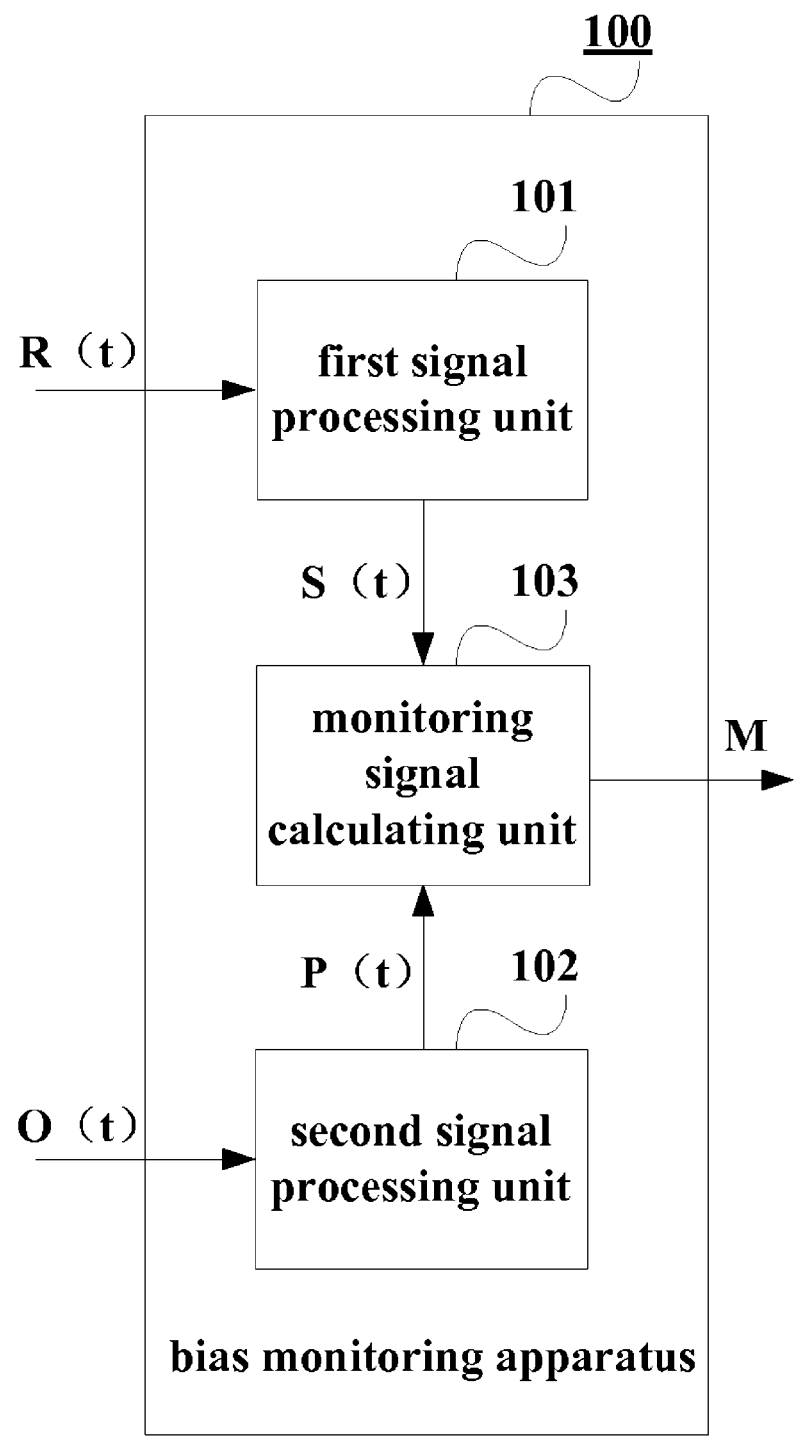
FIG. 1 is a schematic diagram of the structure of the bias monitoring apparatus of Embodiment 1 of the present disclosure.

Embodiment 1 of the present disclosure provides a bias monitoring apparatus, used for monitoring deviation of a direct current bias point of an optoelectronic modulator. FIG. 1 is a schematic diagram of the structure of the bias monitoring apparatus of Embodiment 1 of the present disclosure. As shown in FIG. 1, the bias monitoring apparatus includes: a first signal processing unit 101, a second signal processing unit 102 and a monitoring signal calculating unit 103.

Where the first signal processing unit 101 is configured to perform first signal processing on an electric driving signal R(t) inputted into the optoelectronic modulator, so as to output a reference signal S(t), the second signal processing unit 102 is configured to perform second signal processing on an electric output signal O(t) obtained based on an optical signal outputted by the optoelectronic modulator, so as to output a monitoring signal P(t), and the monitoring signal calculating unit 103 is configured to calculate correlation between the reference signal S(t) and the monitoring signal P(t), and output a calculation result of the correlation as a bias monitoring signal.

In this embodiment, the first signal processing unit 101 directly processes the electric driving signal of the optoelectronic modulator, with no need of providing such devices as an optoelectronic conversion module, etc.; hence, the obtained reference signal is able to keep input information for the optoelectronic modulator, thereby lowering hardware complexity.

In this embodiment, the monitoring signal P(t) outputted by the second signal processing unit 102 is directly subjected to an effect of the bias point of the optoelectronic modulator, hence, the monitoring signal is able to carry information on deviation of the bias point.

In this embodiment, the monitoring signal calculating unit 103 calculates the correlation between the reference signal S(t) and the monitoring signal P(t), the correlation reflecting a degree of deviation of the monitoring signal P(t) from the reference signal S(t), the larger the deviation, the further the bias of the optoelectronic modulator from an ideal point; i.e. the larger a degree of deviation of the direct bias point of the optoelectronic modulator relative to a half-wave transform point Vπ.

Furthermore, in this embodiment, the electric driving signal R(t) and the electric output signal O(t) may be analog signals or digital signals, and the monitoring signal may be a direct current signal.

According to the bias monitoring apparatus of this embodiment, signal processing is performed on the electric driving signal of the optoelectronic modulator to obtain the reference signal, signal processing is performed on the electric output signal obtained based on the optical signal outputted by the optoelectronic modulator to obtain the monitoring signal, and correlation between the reference signal and the monitoring signal is calculated. As the correlation between the reference signal and the monitoring signal is more sensitive to the direct current bias point, sensitivity of the bias monitoring apparatus may be improved and hardware complexity may be lowered.

Figure 2:
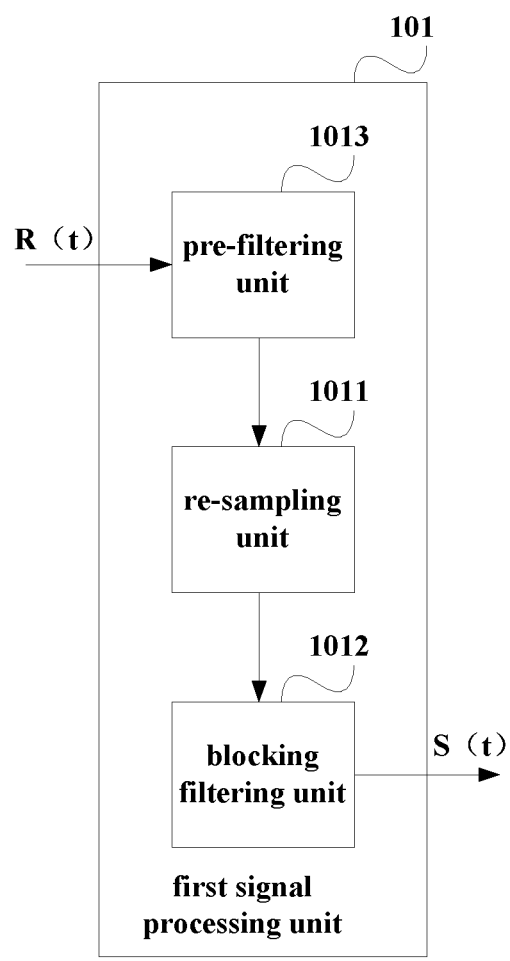
FIG. 2 is a schematic diagram of the structure of the first signal processing unit of Embodiment 1 of the present disclosure.

FIG. 2 is a schematic diagram of the structure of the first signal processing unit of Embodiment 1 of the present disclosure. As shown in FIG. 2, the first signal processing unit 101 includes: a re-sampling unit 1011 and a blocking filtering unit 1012.

Where the re-sampling unit 1011 is configured to re-sample the electric driving signal R(t) according to a sampling rate of the electric output signal O(t), and the blocking filtering unit 1012 is configured to remove a direct current component from a re-sampled signal.

In this embodiment, the re-sampling unit 1011 may re-sample the electric driving signal R(t) according to the sampling rate of the electric output signal O(t), so that the electric driving signal R(t) and the electric output signal O(t) have identical sampling rates. For example, the re-sampling unit 1011 may re-sample the electric driving signal R(t) with reference to the sampling rate of the electric output signal O(t) based on a high-power sinc function difference and an equally-spaced down sampling method; or if a sampling rate of the electric driving signal R(t) is an integral multiple of the sampling rate of the electric output signal O(t), the re-sampling unit 1011 may re-sample the electric driving signal R(t) by directly using a down sampling method. It should be noted that the embodiment of the present disclosure is not limited thereto, and the re-sampling unit may re-sample the electric driving signal R(t) by using other manners.

In this embodiment, in calculating the correlation, it is needed that the reference signal S(t) and the monitoring signal P(t) have identical sampling rates, and the sampling rate of the electric driving signal R(t) inputted into the optoelectronic modulator is usually higher than the sampling rate of the electric output signal O(t). Therefore, with the re-sampling processing by the re-sampling unit 1011, the sampling rates of the reference signal S(t) and the monitoring signal P(t) may be made identical, such that the calculation of the correlation may be performed.

In this embodiment, the blocking filtering unit 1012 may remove the direct current component from the re-sampled signal, such that the outputted reference signal S(t) contains no direct current component. For example, when the electric driving signal R(t) is a digital signal, the blocking filtering unit 1012 directly subtracts an average value of signal from the signal, so as to remove a direct current component in the signal; or the blocking filtering unit 1012 may perform narrow-band high-pass filtering on the electric driving signal R(t), so as to remove a direct current component in the signal. It should be noted that the embodiment of the present disclosure is not limited thereto, and the blocking filtering unit may remove a direct current component from a signal by using other manners.

In this embodiment, as the bias monitoring signal may be a direct current signal, and any direct current component from the reference signal S(t) may have effect on accuracy of the bias monitoring signal, with the processing by the blocking filtering unit 1012, the reference signal S(t) having no direct current component may be generated, thereby avoiding the effect on the bias monitoring signal.

Furthermore, as shown in FIG. 2, in this embodiment, the first signal processing unit 101 may further include a pre-filtering unit 1013. Where the pre-filtering unit may perform filtering processing on the electric driving signal R(t) according to a frequency characteristic of the electric output signal, and input the filtered signal into the re-sampling unit 1011.

In this embodiment, the pre-filtering unit 1013 performs the filtering processing on the electric driving signal R(t) in a digital domain. For example, the filtering processing may be performed by using a digital Bessel filter. Where a response character of the digital filter may be kept consistent with a low-pass character of the electric output signal O(t). It should be noted that the embodiment of the present disclosure is not limited thereto, and the pre-filtering unit may perform the filtering processing on the electric driving signal by using other filters.

In this embodiment, on the one hand, the electric output signal O(t) may be obtained from the optical signal outputted by the optoelectronic modulator after passing an optoelectronic converter. For example, the optoelectronic converter may be a low-speed photodiode, which will have a low-pass filtering effect on a signal. Hence, the electric output signal O(t) may have a low-frequency characteristic. Furthermore, as a signal related to information on bias deviation also has a low-frequency characteristic, it will not be removed by the low-pass effect of the optoelectronic converter, and the signal related to information on bias deviation can still exist in the electric output signal O(t); and on the other hand, the electric driving signal R(t) outputted directly to the optoelectronic modulator may have a relatively high frequency, which is not matched with the frequency characteristic of the electric output signal O(t). Therefore, the electric driving signal R(t) filtered by the pre-filtering unit 1013 may have a frequency characteristic close to that of the electric output signal O(t), hence, the calculation of the correlation between them is facilitated.

Figure 3:
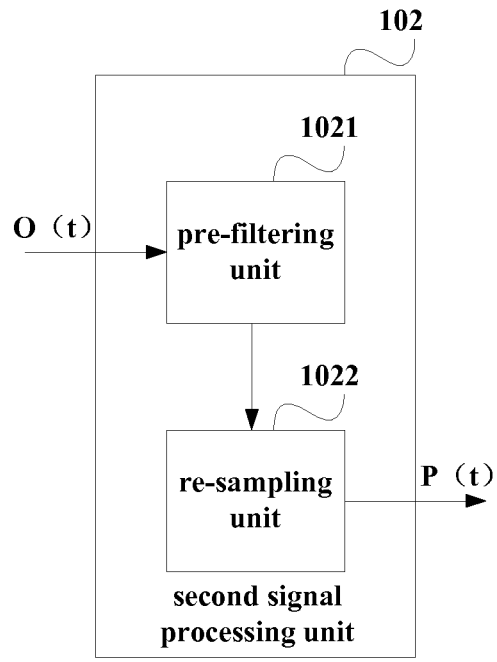
FIG. 3 is a schematic diagram of the structure of the second signal processing unit of an embodiment of the present disclosure.

FIG. 3 is a schematic diagram of the structure of the second signal processing unit of the embodiment of the present disclosure. As shown in FIG. 3, the second signal processing unit may include a pre-filtering unit 1021 and re-sampling unit 1022.

In this embodiment, the pre-filtering unit 1021 is configured to remove high-frequency noises in the electric output signal O(t), and keep the signal related to the information on bias deviation carried in the electric output signal O(t). The relevant art may be referred to for a particular implementation of the pre-filtering unit 1021, which shall not be described in this embodiment any further.

In this embodiment, the re-sampling unit 1022 may resample the electric output signal O(t) according to the sampling rate of the electric driving signal R(t), so that they have identical sampling rates. The description of the re-sampling unit 1011 may be referred to for explanation of the re-sampling unit 1022, which shall not be described herein any further.

Figure 4:
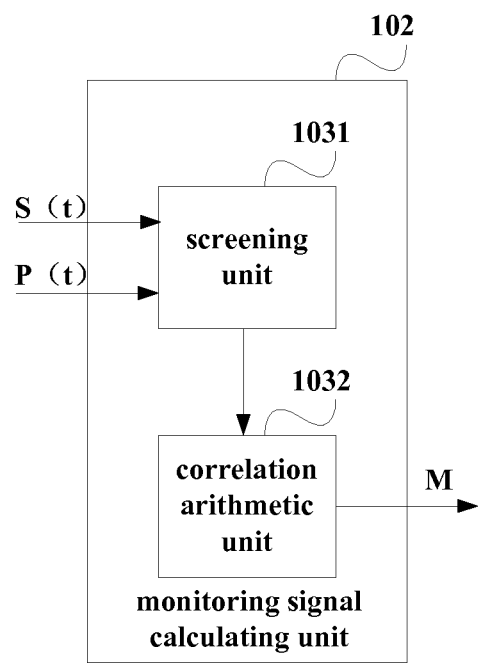
FIG. 4 is a schematic diagram of the structure of the monitoring signal calculating unit of an embodiment of the present disclosure.

FIG. 4 is a schematic diagram of the structure of the monitoring signal calculating unit of the embodiment of the present disclosure. As shown in FIG. 4, the monitoring signal calculating unit may include a screening unit 1031 and a correlation arithmetic unit 1032.

Where the screening unit 1031 is configured to remove sampling points insensitive to the deviation of the direct current bias point in the reference signal S(t) and the monitoring signal P(t), and the correlation arithmetic unit 1032 is configured to calculate correlation between the reference signal and the monitoring signal after being processed by the screening unit 1031, and output a calculation result of the correlation as the bias monitoring signal.

In this embodiment, the sampling points insensitive to the deviation of the direct current bias point may be sampling points having excessive large amplitudes in the reference signal S(t) and the monitoring signal P(t), those sampling points are corresponding to nonlinear compressed states of the signal outputted by the optoelectronic modulator, hence, they cannot reflect the deviation of the direct current bias point. The sampling points insensitive to the deviation of the direct current bias point are illustrated above; however, the embodiment of the present disclosure is not limited thereto, and the sampling points insensitive to the deviation of the direct current bias point may be other sampling points.

In this embodiment, the screening unit 1031 may select the sampling points insensitive to the deviation of the direct current bias point according to amplitudes of the sampling points in the signal, and remove these sampling points, thereby lowering data amount and complexity of the calculation of the correlation.

In this embodiment, the correlation arithmetic unit 1032 may calculate the correlation between the reference signal S(t) and the monitoring signal P(t) after being processed by the screening unit 1031 by using the following formula (1), for example, and output the calculation result of the correlation as the bias monitoring signal M:

$$M = \langle (S(t) \cdot P(t)) \rangle \quad (1);$$

where, <·> denotes a time average used for smoothing a signal noise. A Chinese application for patent with a Publication No. CN103532633A (published on Jan. 22, 2014, and the inventors are Yang, Meng, et al.) may be referred to for detailed explanation of the calculation of the correlation, which shall not be described in this embodiment any further.

With the bias monitoring apparatus provided in this embodiment, the structures of the optoelectronic modulator and the optical transmitter need not to be modified, the format and rate of signal modulation and the pulse forming shape of the transmitter are not limited, and whether an inputted signal of the signal processing unit of the electrical driving signal and the electrical output signal is a digital signal or an analog signal is also not limited. Hence, such a bias monitoring apparatus is one which is relatively universal and simple in structure.

Furthermore, the bias monitoring apparatus is also applicable to a vector IQ modulator, and when the vector IQ modulator is applicable to the bias monitoring apparatus in this embodiment, the direct current bias points in the I path, Q path and IQ path of the vector IQ modulator may be monitored, respectively; that is, input signals I(t), Q(t) and I(t)*Q(t) of the vector IQ modulator may be inputted into the first signal processing unit, respectively, so as to generate three reference signals SI(t), SQ(t) and SI*Q(t), and the correlation between these three reference signals and the monitoring signal P(t) are calculated respectively in the monitoring signal calculating unit, thereby monitoring deviation of the three direct current bias points of the vector IQ modulator.

According to the bias monitoring apparatus of this embodiment, signal processing is performed on the electric driving signals of the optoelectronic modulator to obtain the reference signal, signal processing is performed on the electric output signal obtained based on the optical signal outputted by the optoelectronic modulator to obtain the monitoring signal, and correlation between the reference signal and the monitoring signal is calculated. As the correlation between the reference signal and the monitoring signal is more sensitive to the direct current bias point, sensitivity of the bias monitoring apparatus may be improved and hardware complexity may be lowered.

Embodiment 2

Embodiment 2 of the present disclosure provides a bias monitoring apparatus, including a first signal processing unit, a second signal processing unit and a monitoring signal calculating unit, with the structures and functions of these units being similar to those of the units of the bias monitoring apparatus in Embodiment 1. Furthermore, in Embodiment 2, at least one of the first signal processing unit and the second signal processing unit may include a unit configured to perform time domain nonlinear signal processing on a signal. Following description is given taking that the first signal processing unit includes the unit configured to perform time domain nonlinear signal processing as an example.

As described in Embodiment 1, opto-electric conversion may be performed on the optical output signal of the optoelectronic modulator, so as to obtain the electric output signal O(t). The electric output signal can reflect a change of the direct current bias point of the modulator, and a waveform of the electric output signal O(t) and its sensitivity to the deviation of the direct current bias point of the modulator are related to a transfer characteristic of the optoelectronic modulator and an amplitude of the electric driving signal R(t).

Figure 5:
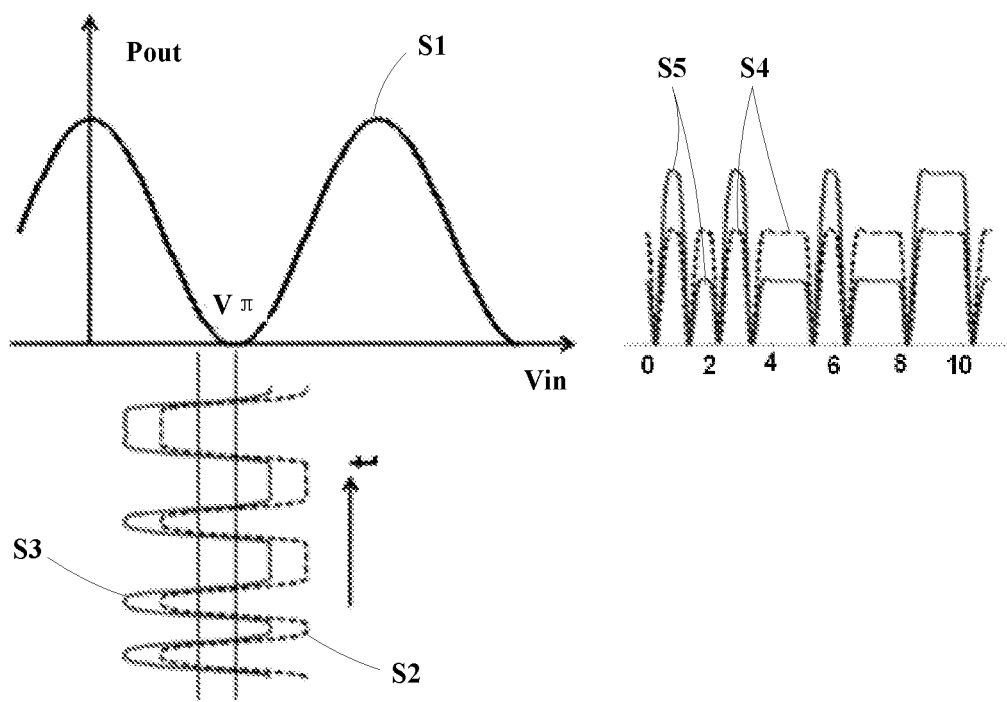
FIG. 5 is a schematic diagram of input and output signals of an optoelectronic modulator.
Figure 6:
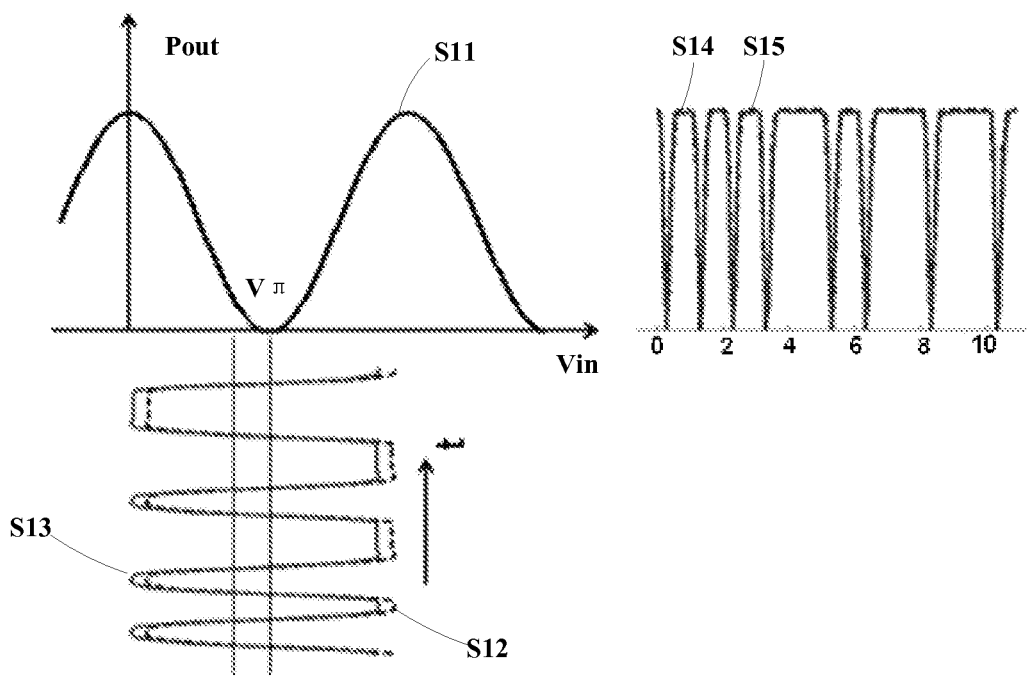
FIG. 6 is another schematic diagram of input and output signals of the optoelectronic modulator.

FIGS. 5 and 6 are schematic diagrams of input and output signals of the optoelectronic modulator in different amplitudes of the electric driving signal. In FIG. 5, it is assumed that the amplitude of the electric driving signal R(t) is Vpp=0.5Vπ, a curve S1 denotes a transfer curve of an intensity signal of the optical output signal of the optoelectronic modulator versus the electric driving signal R(t), a curve S2 denotes that the electric input signal R(t) is biased at an ideal half-wave transfer point, i.e. a Vπ point, a curve S3 denotes that the electric driving signal R(t) is biased at a bias point having deviation from the half-wave transfer point, a curve S4 denotes an intensity curve of the optical output signal corresponding to the curve S2, and a curve S5 denotes an intensity curve of the optical output signal corresponding to the curve S3.

The transfer curve S1 of the optoelectronic modulator is a sinusoidal curve, and when the electric driving signal is biased near the half-wave transfer point Vπ, the intensity of the optical output signal exhibits a linear relationship relative to the input signal, and when the optical output signal is biased at a bias point far from the half-wave transfer point Vπ, the intensity of the optical output signal will be subjected obviously to nonlinear compression. Such a property of the optoelectronic modulator decides that suitable bias is necessarily introduced to ensure a correct transfer relationship.

As shown in FIG. 5, when the inputted electric signal R(t) is biased at the ideal half-wave transfer point, pulse power of the intensity signal of the optical output signal is equal, that is, heights of peaks of the curve S4 are equal; and when the inputted electric signal R(t) is biased at the bias point having deviation from the half-wave transfer point, the pulse power of the intensity signal of the optical output signal is unequal, that is, heights of peaks of the curve S5 are unequal, hence, the curve S5 may reflect the deviation of the bias point of the optoelectronic modulator. Therefore, in a case where the amplitude of the electrical driving signal shown in FIG. 5 is relatively small, the intensity signal of the optical output signal is relatively sensitive to the deviation of the bias point, that is, when the deviation occurs at the bias point, fluctuation will occur in the pulse power.

In FIG. 6, it is assumed that the amplitude of the electric driving signal R(t) is Vpp=2Vπ, a curve S11 denotes a transfer curve of an intensity signal of the optical output signal of the optoelectronic modulator versus the electric driving signal R(t), a curve S12 denotes that the electric input signal R(t) is biased at an ideal half-wave transfer point, i.e. a Vπ point, a curve S13 denotes that the electric input signal R(t) is biased at a bias point having deviation from the half-wave transfer point, a curve S14 denotes an intensity curve of the optical output signal corresponding to the curve S12, and a curve S15 denotes an intensity curve of the optical output signal corresponding to the curve S13.

As shown in FIG. 6, when the inputted electric signal R(t) is biased at the ideal half-wave transfer point, pulse power of the intensity signal of the optical output signal is equal, that is, heights of peaks of the curve S14 are equal; it should be noted that the maximum intensity of the optical output signal has reached the maximum optical intensity that can be outputted by the optoelectronic converter, hence, distortion has occurred at the peaks of the curve S14; and when the inputted electric signal R(t) is biased at the bias point having deviation from the half-wave transfer point, the pulse power of the intensity signal of the optical output signal is still equal, that is, heights of peaks of the curve S15 are equal, hence the curve S14 and the curve S15 almost coincide and the curve S15 may not reflect the deviation of the bias point of the optoelectronic modulator. Therefore, in a case where the amplitude of the electrical driving signal shown in FIG. 6 is relatively large, the maximum value of the intensity signal of the optical output signal has reached the maximum optical intensity that can be outputted by the optoelectronic converter; therefore, when deviation occurs at the bias point, it will not result in a change of the intensity signal of the optical output signal, that is, saturation characteristic of the transfer curve results in that the optical output signal is insensitive to the deviation of the bias point, hence, the electrical output signal obtained based on the optical output signal is also insensitive to the deviation of the bias point.

It can be seen from the analysis of FIGS. 5 and 6 that the sensitivity of the electric output signal O(t) to the deviation of the bias point may be determined by the amplitude of the inputted electric driving signal R(t), and the smaller the amplitude of the electric driving signal R(t), the higher the sensitivity of the electric output signal O(t) to the deviation of the bias point, and hence the higher the sensitivity of the bias monitoring apparatus to the deviation of the bias point. Therefore, proper processing of the electric driving signal in the first processing unit can improve the sensitivity of the bias monitoring apparatus to the deviation of the bias point.

Figure 7:
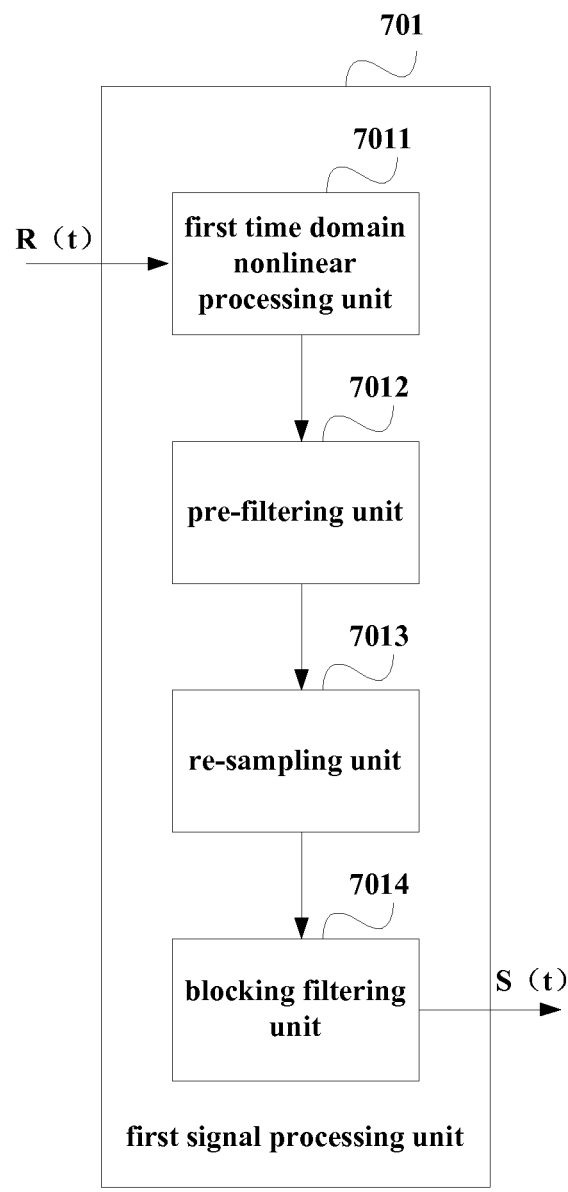
FIG. 7 is a schematic diagram of the structure of the first processing unit of Embodiment 2 of the present disclosure.

FIG. 7 is a schematic diagram of the structure of the first processing unit of Embodiment 2 of the present disclosure. As shown in FIG. 7, the first signal processing unit 701 of Embodiment 2 of the present disclosure may include a first time domain nonlinear processing unit 7011, a pre-filtering unit 7012, a re-sampling unit 7013 and a blocking filtering unit 7014.

Where the pre-filtering unit 7012, the re-sampling unit 7013 and the blocking filtering unit 7014 may have structures and functions identical to those of the corresponding units in Embodiment 1, which shall not be described herein any further. The first time domain nonlinear processing unit 7011 is configured to perform first time domain nonlinear conversion on the electric driving signal, and input the first time domain nonlinear converted signal into the pre-filtering unit.

In this embodiment, the first time domain nonlinear processing unit 7011 may perform any nonlinear variation on the electric driving signal R(t), so as to reduce large signals in the electric driving signal. For example, the first time domain nonlinear processing unit 7011 may perform the nonlinear variation by using a null or amplitude-limiting method for the large signals.

Figure 8:
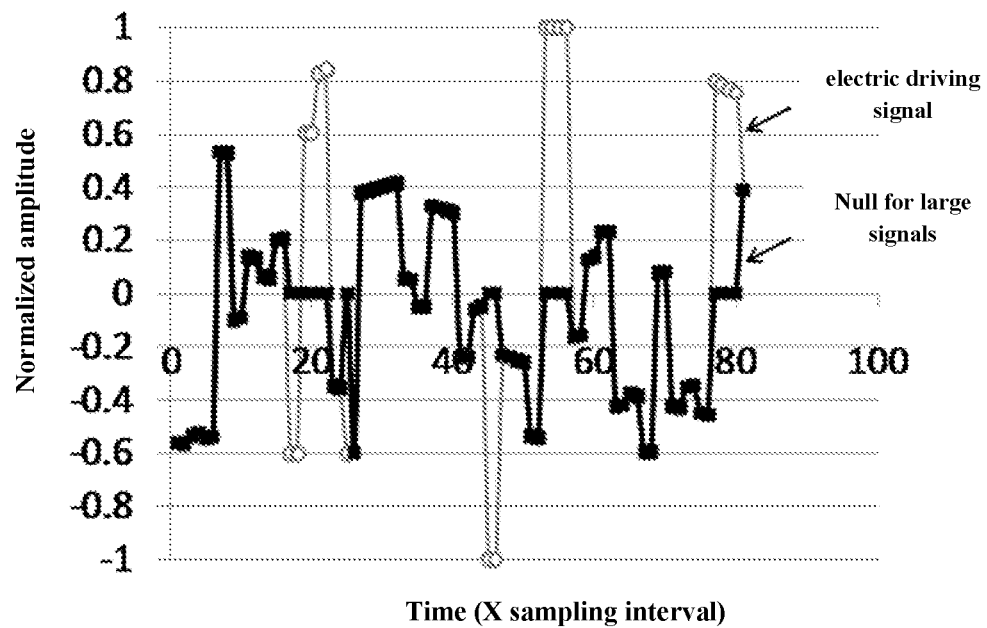
FIG. 8 is a schematic diagram of a null method of large signals.

FIG. 8 is a schematic diagram of a null method of large signals. As shown in FIG. 8, the first time domain nonlinear processing unit 7011 may directly null amplitudes of sampling points of amplitudes greater than or equal to a predefined threshold value in the electric driving signal. For example, the predefined threshold value in FIG. 8 may be set as 0.6, and the sampling points in the electric driving signal denoted by hollow circles are the sampling points of amplitudes greater than or equal to the predefined threshold value. Where 0.6 is an example only, and the embodiment of the present disclosure is not limited thereto, and the predefined threshold value may be set according to a requirement of the bias monitoring apparatus on precision. In this embodiment, after the null operation of large signal, the amplitudes of the sampling points in the signal that may result in lowering of the sensitivity of the bias monitoring apparatus are made to be 0, and the sampling points that may make the sensitivity of the bias monitoring apparatus improved are kept, thereby improving the sensitivity of the bias monitoring apparatus.

Figure 9:
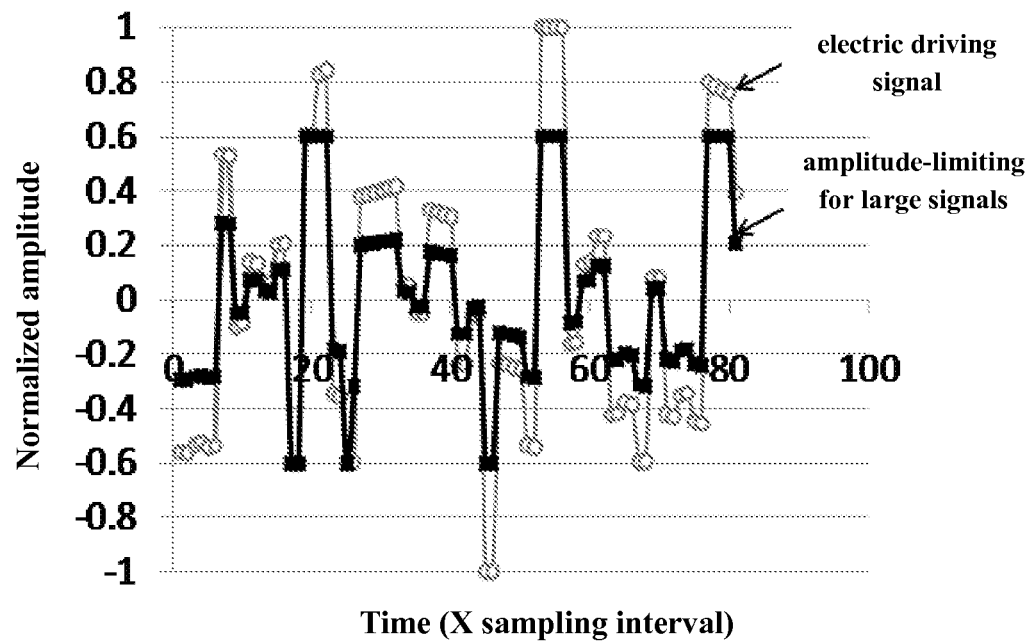
FIG. 9 is a schematic diagram of an amplitude-limiting method of large signals.

FIG. 9 is a schematic diagram of an amplitude-limiting method of large signals. As shown in FIG. 9, the first time domain nonlinear processing unit 7011 may set amplitudes of sampling points of amplitudes greater than or equal to a predefined threshold value in the electric driving signal to be a predefined amplitude unequal to 0. For example, the predefined threshold value in FIG. 9 may be 0.6, and the predefined amplitude may be a value in an interval of [−0.6, +0.6]. However, the embodiment of the present disclosure is not limited thereto, and the predefined threshold value and the predefined amplitude may be set according to a requirement of the bias monitoring apparatus on precision. In this embodiment, after the amplitude-limiting operation of large signal, a proportion of the sampling points in the signal that may result in lowering of the sensitivity of the bias monitoring apparatus are made to be lowered, and a proportion of the sampling points that may make the sensitivity of the bias monitoring apparatus improved are made to be increased, thereby improving the sensitivity of the bias monitoring apparatus.

Figure 10:
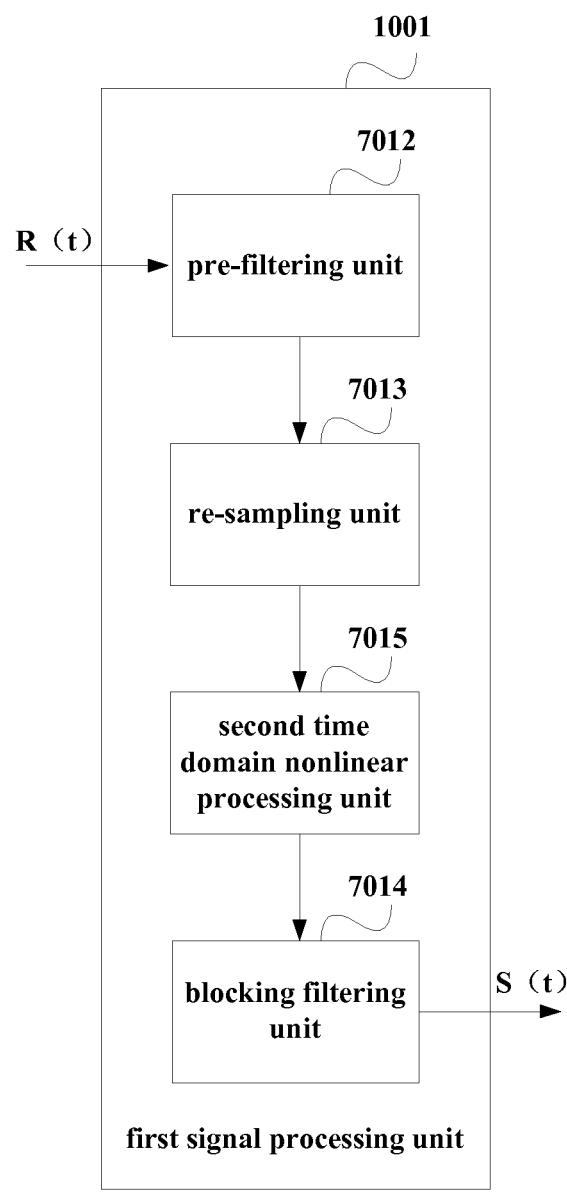
FIG. 10 is another schematic diagram of the structure of the first signal processing unit of Embodiment 2 of the present disclosure.

FIG. 10 is another schematic diagram of the structure of the first signal processing unit of Embodiment 2 of the present disclosure. As shown in FIG. 10, the first signal processing unit 1001 may include a pre-filtering unit 7012, a re-sampling unit 7013, a blocking filtering unit 7014 and a second time domain nonlinear processing unit 7015.

Wherein, the second time domain nonlinear processing unit 7015 may perform time domain nonlinear processing on the signal outputted by the re-sampling unit 7013, with the structure and operational principle of the second time domain nonlinear processing unit 7015 being identical to those of the first time domain nonlinear processing unit 7011, which shall not be described herein any further.

Figure 11:
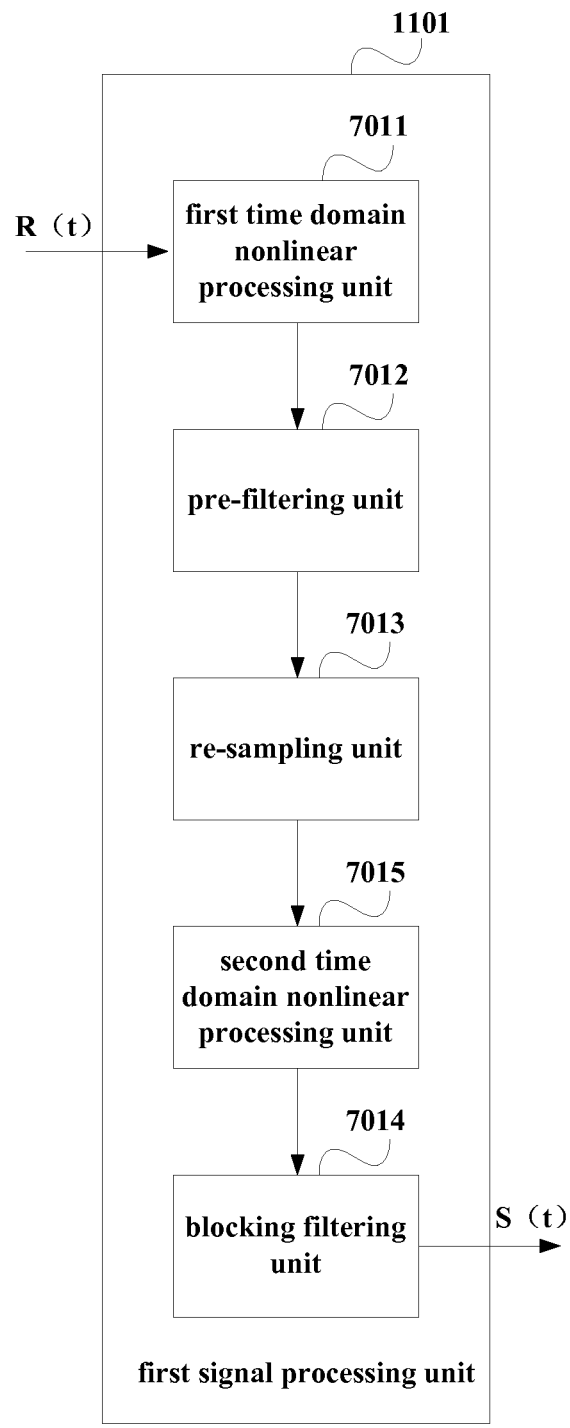
FIG. 11 is a further schematic diagram of the structure of the first signal processing unit of Embodiment 2 of the present disclosure.

FIG. 11 is a further schematic diagram of the structure of the first signal processing unit of Embodiment 2 of the present disclosure. As shown in FIG. 11, the first processing unit 1101 may include a first time domain nonlinear processing unit 7011, a pre-filtering unit 7012, a re-sampling unit 7013, a blocking filtering unit 7014 and a second time domain nonlinear processing unit 7015.

Where the first time domain nonlinear processing unit 7011 is configured to perform time domain nonlinear processing on the electric driving signal R(t), and the second time domain nonlinear processing unit 7015 is configured to perform time domain nonlinear processing on the signal outputted by the re-sampling unit 7013. The above description may be referred to for the structures and operational principles of the first time domain nonlinear processing unit 7011 and the second time domain nonlinear processing unit 7015, which shall not be described herein any further.

The example in which the unit performing the nonlinear signal processing is provided in the first signal processing unit is described above. However, the embodiment of the present disclosure in not limited thereto, and the unit performing the nonlinear signal processing may also be provided in the second signal processing unit.

Figure 12:
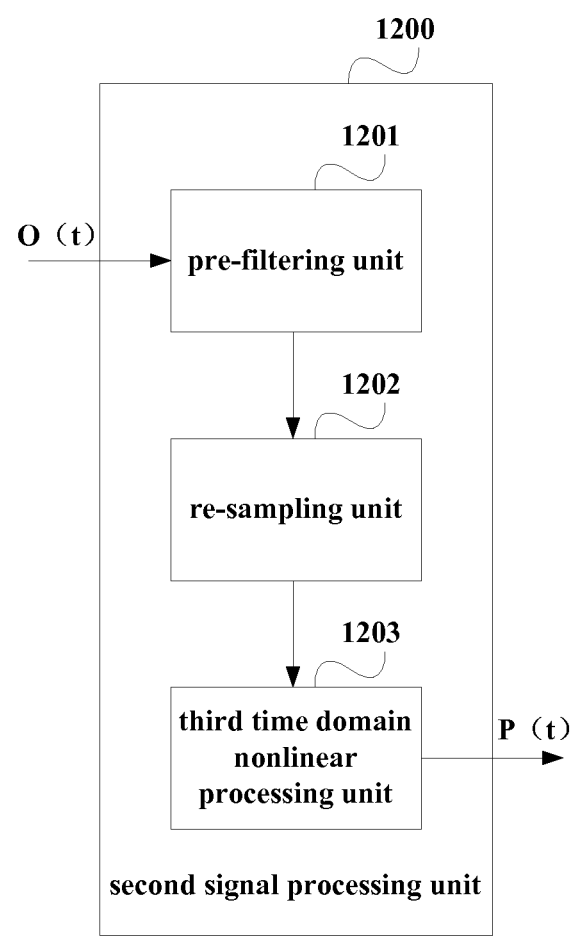
FIG. 12 is another schematic diagram of the structure of the second signal processing unit of Embodiment 2 of the present disclosure.

FIG. 12 is another schematic diagram of the structure of the second signal processing unit of Embodiment 2 of the present disclosure. As shown in FIG. 12, the second processing unit 1200 may include a pre-filtering unit 1201, a re-sampling unit 1202 and a third time domain nonlinear processing unit 1203.

Where the structures and operational principles of the pre-filtering unit 1201 and the re-sampling unit 1202 are identical to those of the pre-filtering unit 1021 and re-sampling unit 1022 in Embodiment 1, which shall not be described herein any further. The third time domain nonlinear processing unit 1203 may perform time domain nonlinear processing on the signal outputted by the re-sampling unit 1202, and the first time domain nonlinear processing unit 7011 may be referred to for the structure and operational principle of the third time domain nonlinear processing unit, which shall not be described herein any further.

In this embodiment, the unit performing the nonlinear signal processing may be provided in the first signal processing unit or in the second signal processing unit, or the unit performing the nonlinear signal processing may be provided both in the first signal processing unit and the second signal processing unit.

Furthermore, in this embodiment, the screening unit of the monitoring signal calculating unit may take the sampling points nulled in the first signal processing unit, the second signal processing unit and/or the third signal processing unit as the sampling points insensitive to the deviation of the direct current bias point, so as to remove these sampling points. In this way, the proportion of the sampling points capable of making the sensitivity of the bias monitoring apparatus improved is further increased, and as unnecessary sampling points are removed, the complexity of the calculation of the correlation is efficiently lowered.

Furthermore, in this embodiment, the bias monitoring apparatus may include all the first signal processing units and the second signal processing units described in embodiments 1 and 2 and a selection switch, and select a first signal processing unit and a second signal processing unit needed in use by the switch.

In the embodiment according to the present disclosure, at least one of the first signal processing unit and the second signal processing unit may include a unit configure to perform time domain nonlinear signal processing on a signal, thereby reducing the sampling points in the signal that may result in lowering of the sensitivity of the bias monitoring apparatus, reserving the sampling points that may make the sensitivity of the bias monitoring apparatus improved, and increasing the sensitivity of the bias monitoring apparatus.

Embodiment 3

Embodiment 3 provides an optical transmitter, including the bias monitoring apparatus as described in embodiments 1 and 2, with the parts identical to those described in embodiments 1 and 2 being not going to be described any further.

Figure 13:
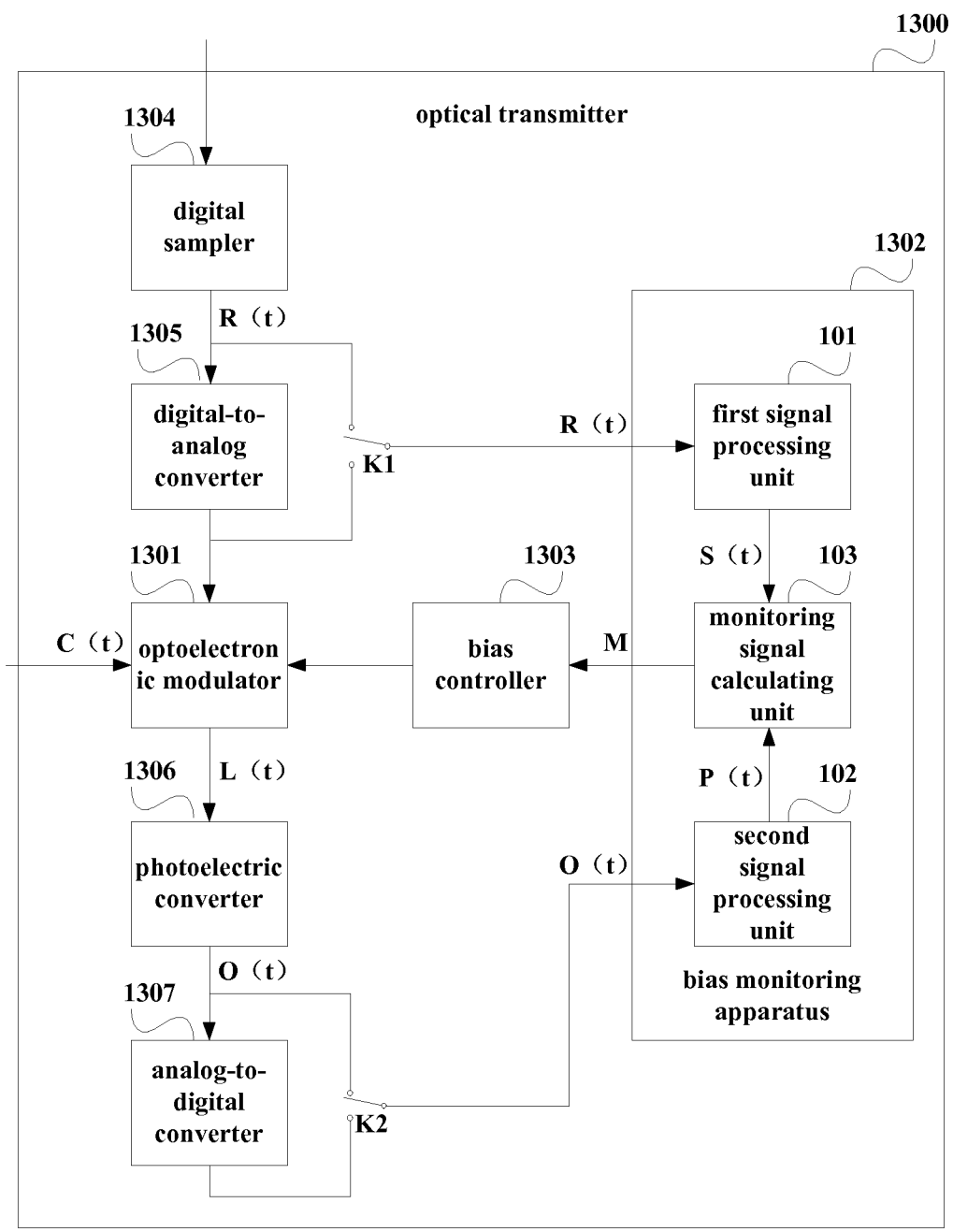
FIG. 13 is a schematic diagram of the structure of the optical transmitter of Embodiment 3 of the present disclosure.

FIG. 13 is a schematic diagram of the structure of the optical transmitter of Embodiment 3 of the present disclosure. As shown in FIG. 13, the optical transmitter 1300 may include an optoelectronic modulator 1301, a bias monitoring apparatus 1302 and a bias controller 1303.

Where the optoelectronic modulator 1301 is configured to modulate an electric driving signal R(t) into an optical carrier C(t), and output an optical output signal L(t), the bias monitoring apparatus 1302 is configured to obtain a bias monitoring signal M according to the electric driving signal and an electric output signal O(t) obtained based on the optical output signal, and the digital bias controller 1303 is configured to adjust a direct current bias point of the optoelectronic modulator 1301 according to the bias monitoring signal M.

In this embodiment, the relevant art may be referred to for the structures of the optoelectronic modulator 1301 and the digital bias controller 1303, and embodiments 1 and 2 may be referred to for the structure of the bias monitoring apparatus 1302, which shall not be described in this embodiment of the present disclosure any further.

In this embodiment, the optical transmitter 1300 may further include a digital sampler 1304, a digital-to-analog converter 1305 and a switch K1. Where the digital sampler 1304 may digitally sample a signal inputted into the optical transmitter, so as to generate the electric driving signal R(t) in a form of digital signal, the digital-to-analog converter 1305 may perform digital-to-analog conversion on an output signal of the digital sampler to generate the electric driving signal R(t) in a form of analog signal, and input the electric driving signal R(t) in the form of analog signal into the optoelectronic modulator, and the switch K1 is configured to select to input the electric driving signal in the form of analog signal or the electric driving signal in the form of digital signal into the bias monitoring apparatus.

In this embodiment, the optical transmitter 1300 may further include a photoelectric converter 1306 configured to convert the optical output signal L(t) outputted by the optoelectronic modulator into the electric output signal O(t) in a form of analog signal. Furthermore, the optical transmitter 1300 may include an analog-to-digital converter 1307 and a switch K2. Where the analog-to-digital converter 1307 may perform analog-to-digital conversion on an output signal of the photoelectric converter, so as to generate the electric output signal O(t) in a form of digital signal, and the switch K2 is configured to select to input the electric driving signal in the form of analog signal or the electric driving signal in the form of digital signal into the bias monitoring apparatus.

In this embodiment, the switch K1 and the switch K2 may select to input the electric driving signal R(t) and the electric output signal O(t) in a form of digital signal into the bias monitoring apparatus, so as to reduce hardware overhead.

According to the embodiment of the present disclosure, as the sensitivity of the bias monitoring apparatus is improved, the bias monitoring apparatus is enabled to control the direct current bias point of the optoelectronic modulator, thereby improving stability of the optoelectronic modulator, and improving stability of the optical transmitter.

Embodiment 4

Embodiment 4 of the present disclosure provides an electronic device, including the optical transmitter described in Embodiment 3.

Figure 14:
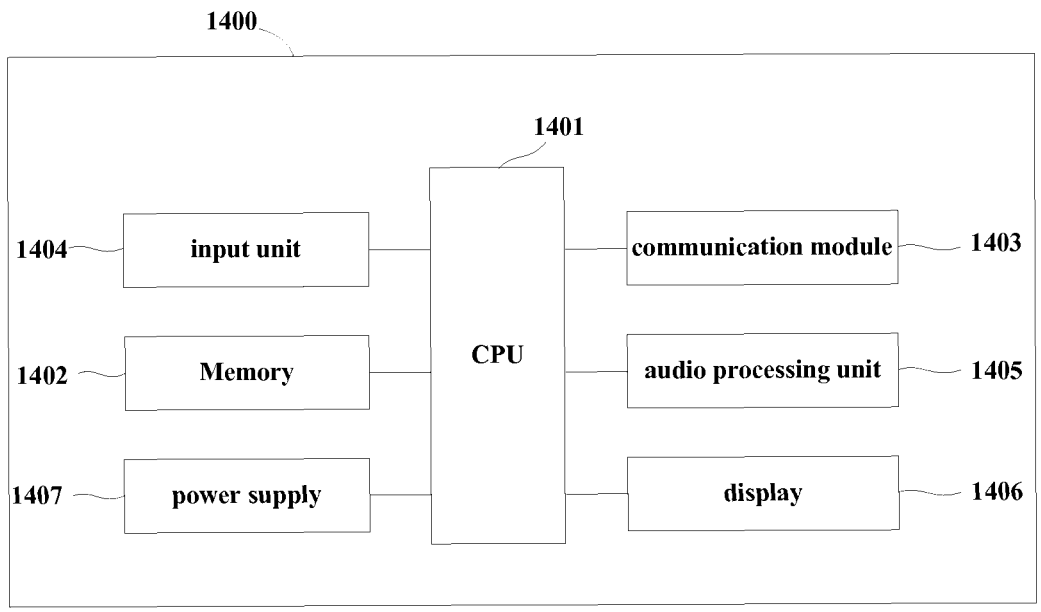
FIG. 14 is a schematic diagram of the structure of the electric device of Embodiment 4 of the present disclosure.

FIG. 14 is a schematic diagram of the structure of the electric device of Embodiment 4 of the present disclosure. As shown in FIG. 14, the electric device 1400 may include a central processing unit 1401 and a memory 1402, the memory 1402 being coupled to the central processing unit 1401. It should be noted that such a figure is exemplary only, and other types of structures may be used to supplement or replace this structure for the realization of telecommunications functions or other functions.

In an implementation, functions of the bias monitoring apparatus in the optical transmitter may be integrated into the central processing unit 1401. Where the central processing unit 1401 may be configured to:

perform first signal processing on an electric driving signal inputted into the optoelectronic modulator, so as to output a reference signal;

perform second signal processing on an electric output signal obtained based on an optical signal outputted by the optoelectronic modulator, so as to output a monitoring signal;

and calculate correlation between the reference signal and the monitoring signal, and output a calculation result of the correlation as a bias monitoring signal.

The central processing unit 1401 may be further configured as: at least one of the first signal processing and the second signal processing includes time-domain nonlinear signal processing; wherein, the time-domain nonlinear signal processing includes: setting an amplitude of a sampling point of which an amplitude is greater than or equal to a predefined threshold value in a signal to be zero, or setting an amplitude of a sampling point of which an amplitude is greater than or equal to a predefined threshold value in a signal to be a predefined amplitude not equal to zero. The central processing unit 1401 may be further configured as: the first signal processing includes: re-sampling the electric driving signal according to a sampling rate of the electric output signal, and removing a direct current component in the re-sampled signal.

The central processing unit 1401 may be further configured as: the first signal processing includes filtering the electric driving signal according to a frequency characteristic of the electric output signal before performing the re-sampling.

The central processing unit 1401 may be further configured as: the first signal processing further includes: before performing the filtering, performing first time-domain nonlinear conversion on the electric driving signal, and/or, performing second time-domain nonlinear conversion on the re-sampled signal.

The central processing unit 1401 may be further configured as: the calculating the correlation between the reference signal and the monitoring signal includes: performing screening processing on the reference signal and the monitoring signal, so as to remove sampling points insensitive to the deviation of a bias point in the reference signal and the monitoring signal, and calculating the correlation between the reference signal and the monitoring signal after being screening processed, and outputting a calculation result of the correlation.

The central processing unit 1401 may be further configured as: the sampling points insensitive to the deviation of the bias point include sampling points set to be zero in the first signal processing and/or the second signal processing.

In another implementation, the bias monitoring apparatus and the central processing unit 1401 may be configured separately. For example, the bias monitoring apparatus may be configured as a chip connected to the central processing unit 1401, with the functions of the bias monitoring apparatus being realized under control of the central processing unit.

As shown in FIG. 14, the electronic device 1400 may further include a communication module 1403, an input unit 1404, an audio processing unit 1405, a display 1406, and a power supply 1407. It should be noted that the electronic device 1400 does not necessarily include all the components shown in FIG. 14. Where when the functions of the bias monitoring apparatus in the optical transmitter are integrated into the central processing unit 1401, the communication module 1403 may include other units in the optical transmitter than the bias monitoring apparatus, and when the bias monitoring apparatus is configured as a chip connected to the central processing unit 1401, the communication module 1403 may include the chip, such that the communication module 1403 is able to include all the units constituting the optical transmitter. Furthermore, the electronic device 1400 may include parts that are not shown in FIG. 14, and the prior art may be referred to.

As shown in FIG. 14, the central processing unit 1401 is sometimes referred to as a controller or control, and may include a microprocessor or other processor devices and/or logic devices; and the central processing unit 1401 receives input and controls operations of each part of the electronic device 1400.

Where the memory 1402 may be, for example, one or more of a buffer, a flash memory, a hard drive, a movable medium, a volatile memory, a nonvolatile memory, or other suitable devices, and may store a program executing related information. And the central processing unit 1401 may executed the program stored in the memory 1402, so as to realize information storage or processing, etc. Functions of other parts are similar to those of the prior art, and shall not be described herein any further. The parts of the electronic device 1400 may be realized by hardware, firmware, software, or a combination thereof, without departing from the scope of the present disclosure.

Embodiment 5

Embodiment 5 of the present disclosure provides a bias monitoring method, used for monitoring deviation of a direct current bias point of an optoelectronic modulator, and corresponding to the bias monitoring apparatus described in embodiments 1 and 2, with the contents identical to those described in embodiments 1 and 2 being not going to be described any further.

Figure 15:
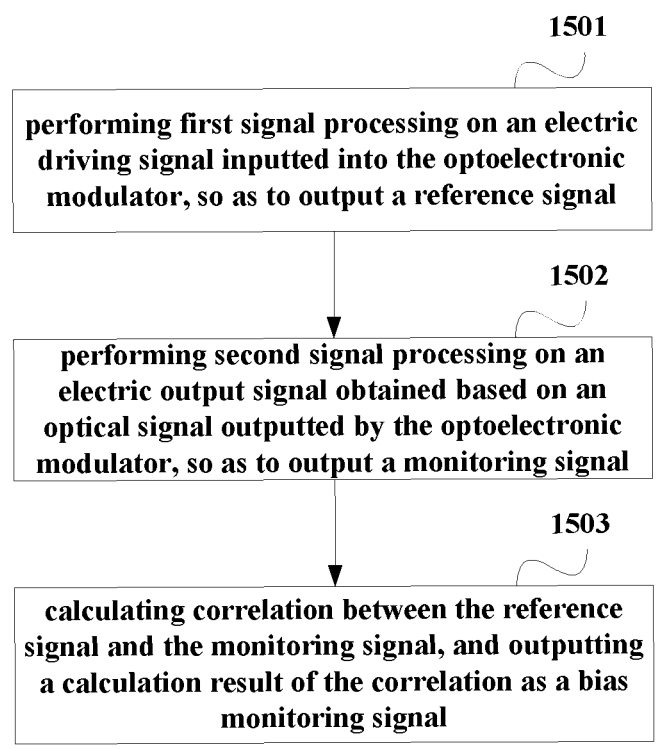
FIG. 15 is a flowchart of the bias monitoring method of Embodiment 5 of the present disclosure.

FIG. 15 is a flowchart of the bias monitoring method of Embodiment 5 of the present disclosure. As shown in FIG. 15, the bias monitoring method includes:

step 1501: performing first signal processing on an electric driving signal inputted into the optoelectronic modulator, so as to output a reference signal;

step 1502: performing second signal processing on an electric output signal obtained based on an optical signal outputted by the optoelectronic modulator, so as to output a monitoring signal; and step 1503: calculating correlation between the reference signal and the monitoring signal, and outputting a calculation result of the correlation as a bias monitoring signal.

In this embodiment, at least one of the first signal processing and the second signal processing includes time-domain nonlinear signal processing.

Figure 16:
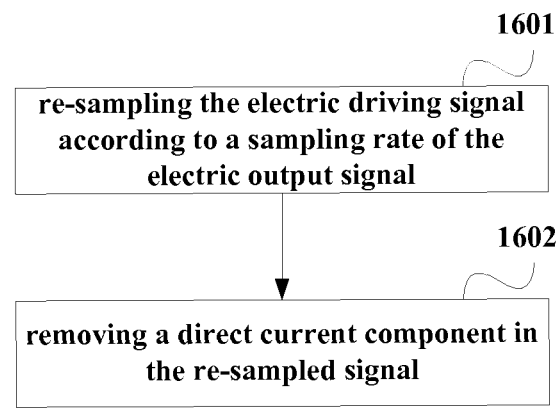
FIG. 16 is a flowchart of the method of first signal processing of Embodiment 5 of the present disclosure.

FIG. 16 is a flowchart of the method of first signal processing of Embodiment 5 of the present disclosure. As shown in FIG. 16, the method includes:

step 1601: re-sampling the electric driving signal according to a sampling rate of the electric output signal; and step 1602: removing a direct current component in the re-sampled signal.

Figure 17:
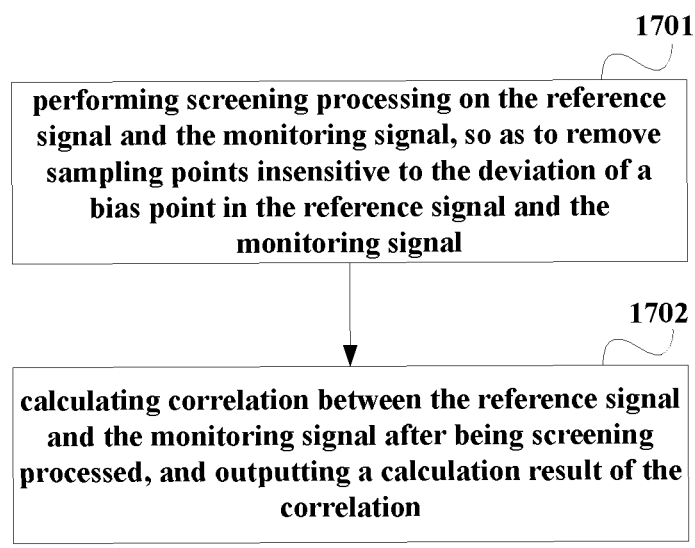
FIG. 17 is a flowchart of the method for calculating correlation between reference signals and monitoring signals of Embodiment 5 of the present disclosure.

FIG. 17 is a flowchart of the method for calculating correlation between the reference signal and the monitoring signal of Embodiment 5 of the present disclosure. As shown in FIG. 17, the method includes:

step 1701: performing screening processing on the reference signal and the monitoring signal, so as to remove sampling points insensitive to the deviation of a bias point in the reference signal and the monitoring signal; and step 1701: calculating correlation between the reference signal and the monitoring signal after being screening processed, and outputting a calculation result of the correlation.

Refer to detailed operational modes of the corresponding units in embodiments 1 and 2 for detailed operational modes of the steps in this embodiment, which shall not be described herein any further.

With the bias monitoring method of this embodiment, sensitivity of bias monitoring may be improved, and hardware complexity may be lowered.

An embodiment of the present disclosure provides a computer-readable program, wherein when the program is executed in an information processing apparatus or user equipment, the program enables the computer to carry out the bias monitoring method as described in Embodiment 5 in the information processing apparatus or user equipment.

An embodiment of the present disclosure further provides a storage medium in which a computer-readable program is stored, wherein the computer-readable program enables the computer to carry out the bias monitoring method as described in Embodiment 5 in an information processing apparatus or user equipment.

An embodiment of the present disclosure provides a computer-readable program, wherein when the program is executed in an information processing apparatus or a base station, the program enables the computer to carry out the bias monitoring method as described in Embodiment 5 in the information processing apparatus or base station.

An embodiment of the present disclosure further provides a storage medium in which a computer-readable program is stored, wherein the computer-readable program enables the computer to carry out the bias monitoring method as described in Embodiment 5 in an information processing apparatus or base station.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the spirits and principle of the present disclosure, and such variants and modifications fall within the scope of the present disclosure.

As to implementations including the above embodiments, following supplements are further disclosed:

Supplement 1. A bias monitoring apparatus, used for monitoring deviation of a direct current bias point of an optoelectronic modulator, the bias monitoring apparatus including:

a first signal processing unit, configured to perform first signal processing on an electric driving signal inputted into the optoelectronic modulator, so as to output a reference signal;

a second signal processing unit, configured to perform second signal processing on an electric output signal obtained based on an optical signal outputted by the optoelectronic modulator, so as to output a monitoring signal; and a monitoring signal calculating unit, configured to calculate correlation between the reference signal and the monitoring signal, and output a calculation result of the correlation as a bias monitoring signal.

Supplement 2. The bias monitoring apparatus according to supplement 1, wherein at least one of the first signal processing and the second signal processing includes time-domain nonlinear signal processing.

Supplement 3. The bias monitoring apparatus according to supplement 2, wherein the time-domain nonlinear signal processing includes:

setting an amplitude of a sampling point of which an amplitude is greater than or equal to a predefined threshold value in a signal to be zero, or setting an amplitude of a sampling point of which an amplitude is greater than or equal to a predefined threshold value in a signal to be a predefined amplitude not equal to zero.

Supplement 4. The bias monitoring apparatus according to supplement 1, wherein the first signal processing unit includes:

a re-sampling unit, configured to re-sample the electric driving signal according to a sampling rate of the electric output signal; and a blocking filtering unit, configured to remove a direct current component in the re-sampled signal.

Supplement 5. The bias monitoring apparatus according to supplement 4, wherein the first signal processing unit further includes:

a pre-filtering unit, configured to filter the electric driving signal according to a frequency characteristic of the electric output signal, and input the filtered signal into the re-sampling unit.

Supplement 6. The bias monitoring apparatus according to supplement 5, wherein the first signal processing unit further includes:

a first time-domain nonlinear processing unit, configured to perform first time-domain nonlinear conversion on the electric driving signal, and input the first time-domain nonlinear converted signal into the pre-filtering unit; and/or, a second time-domain nonlinear processing unit, configured to perform second time-domain nonlinear conversion on the re-sampled signal.

Supplement 7. The bias monitoring apparatus according to supplement 1, wherein the monitoring signal calculating unit includes:

a screening unit, configured to remove sampling points insensitive to the deviation of the bias point in the reference signal and the monitoring signal; and a correlation arithmetic unit, configured to calculate correlation between the reference signal and the monitoring signal after being processed by the screening unit, and output a calculation result of the correlation as the bias monitoring signal.

Supplement 8. The bias monitoring apparatus according to supplement 7, wherein the sampling points insensitive to the deviation of the bias point include sampling points set to be zero in the first signal processing and/or the second signal processing.

Supplement 9. An optical transmitter, including an optoelectronic modulator, a bias control device and the bias monitoring apparatus as described in any one of supplements 1-8; wherein the bias control device regulates a bias point of the optoelectronic modulator according to the bias monitoring signal.

Supplement 10. A bias monitoring method, used for monitoring deviation of a direct current bias point of an optoelectronic modulator, the bias monitoring method including:

performing first signal processing on an electric driving signal inputted into the optoelectronic modulator, so as to output a reference signal;

performing second signal processing on an electric output signal obtained based on an optical signal outputted by the optoelectronic modulator, so as to output a monitoring signal; and calculating correlation between the reference signal and the monitoring signal, and outputting a calculation result of the correlation as a bias monitoring signal.

Supplement 11. The bias monitoring method according to supplement 10, wherein at least one of the first signal processing and the second signal processing includes time-domain nonlinear signal processing.

Supplement 12. The bias monitoring method according to supplement 11, wherein the time-domain nonlinear signal processing includes:

setting an amplitude of a sampling point of which an amplitude is greater than or equal to a predefined threshold value in a signal to be zero, or setting an amplitude of a sampling point of which an amplitude is greater than or equal to a predefined threshold value in a signal to be a predefined amplitude not equal to zero.

Supplement 13. The bias monitoring method according to supplement 10, wherein the first signal processing includes:

re-sampling the electric driving signal according to a sampling rate of the electric output signal; and removing a direct current component in the re-sampled signal.

Supplement 14. The bias monitoring method according to supplement 13, wherein the first signal processing includes:

filtering the electric driving signal according to a frequency characteristic of the electric output signal before performing the re-sampling.

Supplement 15. The bias monitoring method according to supplement 14, wherein the first signal processing further includes:

before performing the filtering, performing first time-domain nonlinear conversion on the electric driving signal; and/or, performing second time-domain nonlinear conversion on the re-sampled signal.

Supplement 16. The bias monitoring method according to supplement 1, wherein the calculating the correlation between the reference signal and the monitoring signal includes:

performing screening processing on the reference signal and the monitoring signal, so as to remove sampling points insensitive to the deviation of the bias point in the reference signal and the monitoring signal; and calculating the correlation between the reference signal and the monitoring signal after being screening processed, and outputting a calculation result of the correlation.

Supplement 17. The bias monitoring method according to supplement 16, wherein the sampling points insensitive to the deviation of the bias point include sampling points set to be zero in the first signal processing and/or the second signal processing.

The invention claimed is:

1. A bias monitoring apparatus, used for monitoring deviation of a direct current bias point of an optoelectronic modulator, the bias monitoring apparatus comprising:

a first signal processing unit, configured to perform first signal processing on an electric driving signal input into the optoelectronic modulator to output a reference signal;

a second signal processing unit, configured to perform second signal processing on an electric output signal obtained based on an optical signal output by the optoelectronic modulator to output a monitoring signal; and a monitoring signal calculating unit, configured to calculate a correlation between the reference signal and the monitoring signal, and output a calculation result of the correlation as a bias monitoring signal; wherein at least one of the first signal processing and the second signal processing comprises time-domain nonlinear signal processing.

2. The bias monitoring apparatus according to claim 1, wherein the time-domain nonlinear signal processing comprises:

setting one of an amplitude of a sampling point of which an amplitude is greater than or equal to a predefined threshold value in a signal to zero and the amplitude of the sampling point of which the amplitude is greater than or equal to the predefined threshold value in the signal to be the predefined amplitude not equal to zero.

3. The bias monitoring apparatus according to claim 1, wherein the first signal processing unit comprises:

a re-sampling unit, configured to re-sample the electric driving signal according to a sampling rate of the electric output signal; and a blocking filtering unit, configured to remove a direct current component in a re-sampled signal.

4. The bias monitoring apparatus according to claim 3, wherein the first signal processing unit further comprises:

a pre-filtering unit, configured to filter the electric driving signal according to a frequency characteristic of the electric output signal, and input a filtered signal into the re-sampling unit.

5. The bias monitoring apparatus according to claim 4, wherein the first signal processing unit further comprises: one or both of:

a first time-domain nonlinear processing unit, configured to perform first time-domain nonlinear conversion on the electric driving signal, and input a first time-domain nonlinear converted signal into the pre-filtering unit; and, a second time-domain nonlinear processing unit, configured to perform second time-domain nonlinear conversion on the re-sampled signal.

6. The bias monitoring apparatus according to claim 1, wherein the monitoring signal calculating unit comprises:

a screening unit, configured to remove sampling points insensitive to the deviation of the bias point in the reference signal and the monitoring signal; and a correlation arithmetic unit, configured to calculate a correlation between the reference signal and the monitoring signal after being processed by the screening unit, and output a calculation result of the correlation as the bias monitoring signal.

7. The bias monitoring apparatus according to claim 6, wherein the sampling points insensitive to the deviation of the bias point comprise set sampling points set to be zero in one or both of the first signal processing and the second signal processing.

8. An optical transmitter, comprising an optoelectronic modulator, a bias control device and the bias monitoring apparatus as claimed in claim 1; wherein the bias control device regulates the bias point of the optoelectronic modulator according to the bias monitoring signal.

9. A bias monitoring method, used for monitoring deviation of a direct current bias point of an optoelectronic modulator, the bias monitoring method comprising:

performing first signal processing on an electric driving signal input into the optoelectronic modulator to output a reference signal;

performing second signal processing on an electric output signal obtained based on an optical signal output by the optoelectronic modulator to output a monitoring signal; and calculating a correlation between the reference signal and the monitoring signal, and outputting a calculation result of the correlation as a bias monitoring signal; wherein at least one of the first signal processing and the second signal processing comprises time-domain nonlinear signal processing.

* * * * *